United States Patent Office 3,618,491
Patented Nov. 9, 1971

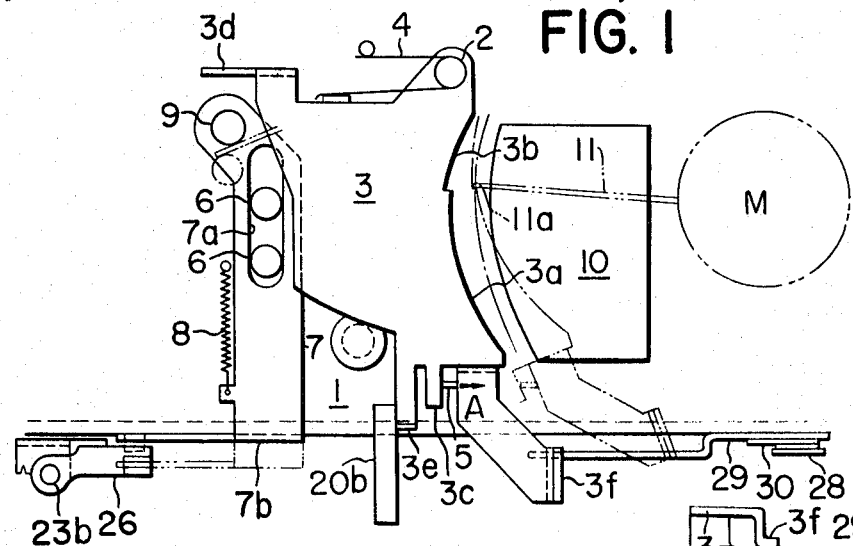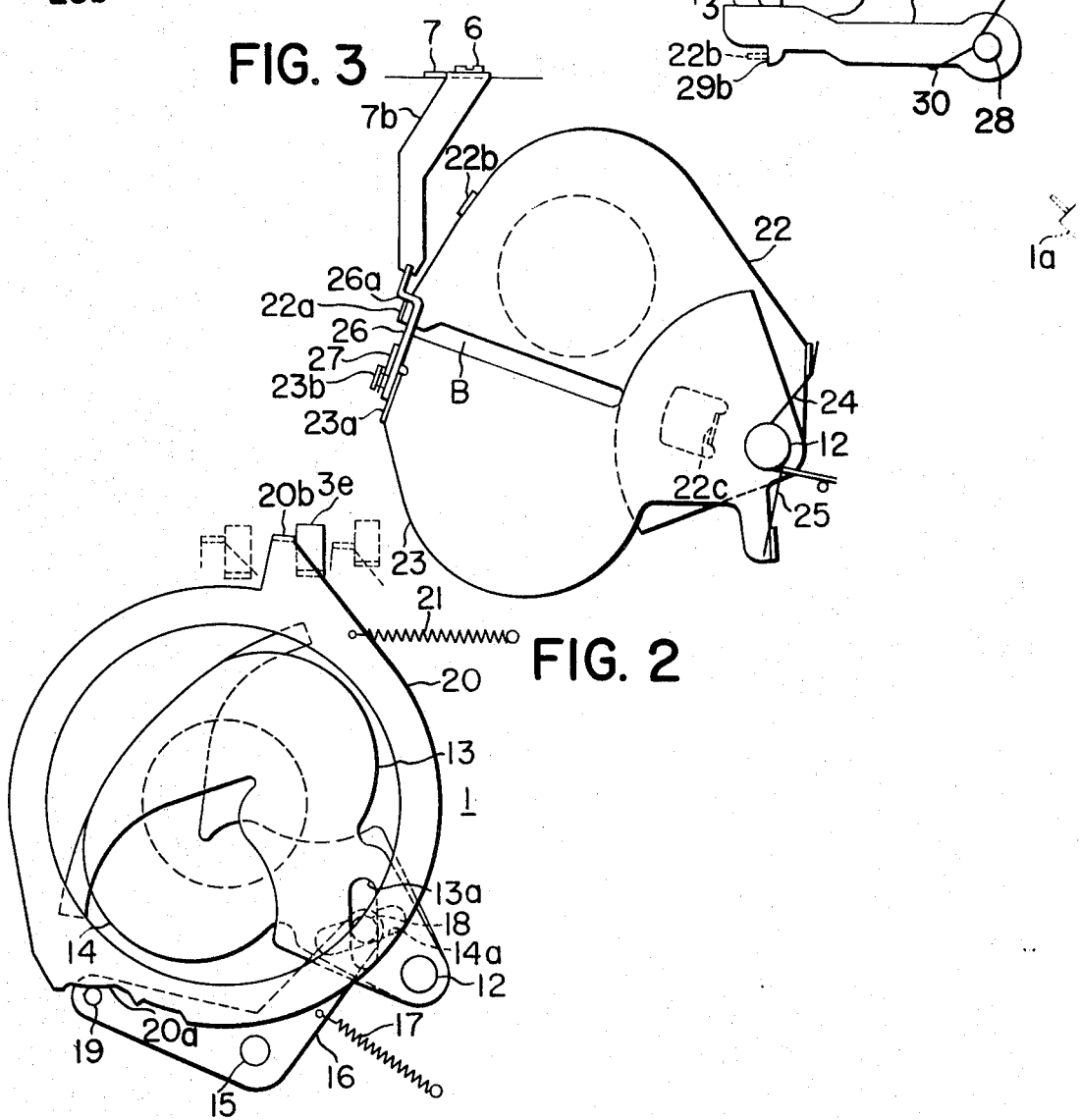

3,618,491
AUTOMATIC EXPOSURE ADJUSTMENT MECHANISM
Akio Furukawa, Yokohama-shi, Japan, assignor to Kabushiki Kaisha Ricoh, Tokyo, Japan
Filed Nov. 28, 1969, Ser. No. 880,746
Claims priority, application Japan, Nov. 29, 1968, 43/104,100
Int. Cl. G03b 7/14, 9/16
U.S. Cl. 95—10 C       1 Claim

ABSTRACT OF THE DISCLOSURE

An automatic exposure adjustment mechanism wherein when the brightness of a subject to be photographed is higher than a predetermined level, the displacement of a shutter speed switching member is so controlled through an exposure meter pointer that a shutter may be actuated for a high speed exposure, whereas when the brightness of the subject is low, the displacement of said switching member is so increased that the shutter may be actuated for a low speed exposure and simultaneously the aperture diaphragms may be opened. A programmed shutter simple in construction may be easily provided and the exposure range may be further widened as compared with the conventional shutter wherein the shutter speed is constant while only the aperture is variable.

BACKGROUND OF THE INVENTION

The present invention relates to an automatic exposure mechanism for cameras and more particularly to an automatic exposure adjustment mechanism for coupled exposure meter cameras.

In the conventional camera of the type in which the shutter speed is constant while only the aperture is variable, the exposure adjustment is only limited within the aperture range. In the camera of the type described, the exposure for a relatively long time cannot be made so that the use of the cameras is extremely limited.

Accordingly, one of the objects of the present invention is to provide a programmed shutter mechanism simple in construction.

Another object of the present invention is to provide a camera incorporating an automatic exposure adjustment mechanism which permits the exposure in a wide range.

SUMMARY OF THE INVENTION

In the present invention, a shutter speed switching member provided with high and low brightness cam portions is utilized. When the brightness of a subject to be photographed is high, the pointer of a meter is adapted to contact with the high brightness cam portion so as to control the displacement of the shutter speed switching member, so that the shutter is opened and closed at a high speed while the aperture remains at a relative small top. On the other hand, when the brightness of the subject is low, the pointer contacts with the low brightness cam portion so that the displacement of the shutter speed switching member may become larger than that in case of the high brightness or high speed exposure. That is, upon displacement of the shutter speed switching member, the first shutter blade is released from the second shutter blade so that only the first shutter blade is actuated or driven, thereby effecting a low speed exposure while the aperture is relatively wide opened.

One of the novel features of the present invention resides in the fact that the exposure time can be remarkably increased as compared with the camera of the type in which the shutter speeds remain constant while only the aperture is variable, thereby remarkably increasing the exposure range.

The above and other objects, features and advantages of the present invention will become more apparent from the following description of one illustrative embodiment thereof with reference to the accompanying drawings.

BRIEF DESCRIPTION OF THE DRAWINGS

FIG. 1 is a plan view of one embodiment of an automatic exposure adjustment mechanism of the present invention;

FIG. 2 is a front view illustrating the diaphragm drive section;

FIG. 3 is a front view illustrating the shutter blade drive section; and

FIG. 4 is a front view illustrating a shutter blade stop or detent lever.

DESCRIPTION OF THE PREFERRED EMBODIMENT

Referring to FIG. 1, a shutter speed switching member generally indicated by 3 is rotatably fixed to a base 1 bent at a right angle by means of a pin 2 and has a tendency of rotating in the counterclockwise direction by means of a spring 4. The shutter speed switching member 3 has a high intensity cam portion 3a, a low intensity cam portion 3b and a projection 3c which is normally engaged with a shutter release lever 5 so as to retain the shutter speed switching member 3 in the position indicated by the solid line in FIG. 1 against the spring 4. The cam portions 3a and 3b are in opposed relation with the bent leading end 11a of a pointer 11 of an exposure meter M. The base 1 has a connecting and switching lever 7 which has an elongated slot 7a formed through the lever 7 and fitted with pins 6, so that the switching lever 7 is slidable relative to the base 1 and normally lifted upwardly by means of a spring 8 interposed between the lever 7 and a pin extended from the base 1. The switching lever 7 has a bent leading end 7b and a pin 9, which engages with the bent portion 3d of the switching member 3 when the latter is rotated as will be described in more detail hereinafter. A retaining plate 10 for the pointer 11 is fixed to the base 1 so that when the shutter speed switching member 3 rotates, the retaining plate 10 holds the bent portion 11a of the pointer 11 between the retaining plate 10 and the cam portions 3a and 3b as will be described in more detail hereinafter.

Referring to FIG. 2, to the vertical surface of the base 1 are rotatably fixed aperture diaphragms 13 and 14 by means of a pin 12. These aperture diaphragms 13 and 14 are provided with elongated slots 13a and 14a which intersect with each other. A diaphragm drive lever 16 is rotatably fixed to the base 1 by means of a pivot 15 and has a tendency of rotating in the clockwise direction in FIG. 2 by means of a spring 17 interposed between the base 1 and the aperture diaphragm drive lever 16. A pin 18 is extended from one end of the drive lever 16 whereas another pin 19, extends from the other end thereof. The pin 18 is loosely fitted into both of the elongated slots 13a and 14a of the diaphragms 13 and 14 so that when the drive lever 16 rotates, the pin 8 causes both of the diaphragms 13 and 14 to rotate so as to control the aperture of the lens. An aperture diaphragm cam ring 20 is disposed rotatably about the optical axis of the lens and has a tendency of rotating in the clockwise direction in FIG. 2 by means of a spring 21 interposed between the base 1 and the ring 20. The cam portion 20a is formed along the outer periphery of the aperture cam ring 20 and adapted to engage with the pin 19 of the drive lever 16. The bent portion 20b of the aperture cam ring 20 is in engagement with the leading end 3e of the shutter speed switching member 3.

As shown in FIG. 3, first and second shutter blades 22 and 23 are also rotatably fitted to the base 1 by the pivot 12 in superposed relation with the diaphragms 13 and 14 and have a tendency of rotating in the counterclockwise direction by means of springs 24 and 25 interposed between the base 1 and the shutter blades 22 and 23 respectively. At the leading end of the first shutter blade 22 is provided a bent portion 22a which is in engagement with the bent portion 26a of a connecting lever 26 which in turn is rotatably fixed to the bent portion 23a of the second shutter blade 23 and is imparted with a tendency of rotating by a spring 27 backwardly of FIG. 3. In this state, both of the first and second shutter blades 22 and 23 are not moved away from each other, but leave a gap B having a predetermined width for measuring the intensity of a subject to be photographed. The free end of the connecting lever 26 is in engagement with the bent portion 7b of the connecting and switching lever 7. A shutter blade detent or stop lever 29 is pivotably fixed on the base 1 by a pin 28 and is normally biased to rotate in the clockwise direction by means of a spring 30 in FIG. 4. The shutter blade detent lever 29 has a sloping portion 29a formed at the upper side thereof and a stepped portion 29b formed at the lower side thereof and is in engagement with the bent portion 3f of the shutter speed switching member 3 at the upper side of the leading portion thereof. The stepped portion 29b is adapted to engage with the bent portion 22b of the first shutter blade 22 when the shutter button is depressed.

When the bent, leading end portion 11a of the pointer 11 of the meter M is located in opposed relation with the high intensity cam portion 3a (that is, when the brightness of a subject to be photographed is high), the shutter speed switching member 3 is caused to rotate in the counterclockwise direction by the spring 4 upon displacement of the shutter release lever 5 in the direction indicated by the arrow A, so as to press against the pointer retaining plate 10. In this case, the aperture cam ring 20 which is operatively coacted with the rotation of the shutter speed switching member 3 described above is caused to rotate in the clockwise direction by the spring 21 (see FIG. 2), so that the position of the engagement of the pin 19 with the cam portion 20a is displaced. Therefore, the drive lever 16 is displaced or rotated so that the relative position between the diaphragms 13 and 14 is varied, whereby the aperture is determined. Under the conditions described above, the bent portion 3d of the shutter switching member 3 is not in engagement with the pin 9 and the coupling lever 26 keep the first and second shutter blades 22 and 23 interconnected. Since the bent portion 3f prevents the rotation of the detent lever 29, the latter remains in the position indicated upon displacement of the shutter release lever 5, a shutter blade drive lever (not shown) kicks the bent portion 22c of the shutter blade 22 so that the latter is caused to rotate in the clockwise direction (in FIG. 3) against the spring 24. Thereafter when the shutter drive lever is released from the bent portion 22c, the shutter blade 22 keeps rotating by its own inertia. In the first stage of the rotation of the first shutter blade 22, the second shutter blade 23 rotates in unison with the first shutter blade 22 in such a manner that the gap or slit B may be retained by means of the coupling lever 26. This is a high speed exposure. When the bent portion 22b of the first shutter blade 22 abuts against the stepped portion 29b of the shutter blade detent member 29 so that the shutter blade 22 is stopped, the second shutter blade 23 engages with the first shutter blade 22 in slightly overlapped relation with each other so that the slit or gap B is eliminated. Thereafter, both of the shutter blades 22 and 23 are caused to return to their initial positions by means of the springs 24 and 25 while the above described overlapped relation remains unchanged.

When the bent portion 11a of the pointer 11 of the meter M is in opposed relation with the low brightness or intensity cam portion 3b of the shutter speed switching member 3, (that is when the brightness of a subject to be photographed is low), upon the displacement of the shutter release lever 5 in the direction indicated by the arrow A, the shutter speed switching member 3 is caused to rotate through an angle larger than that when the bent portion 11a of the pointer 11 is in opposed relation with the high brightness cam portion 3a, so that the pin 9 is caused to rotate by the bent portion 3d of the shutter speed switching member 3. Therefore, the coupling lever 26 is rotated through the switching lever 7. Upon rotation of the coupling lever 26, the engagement between the first and second shutter blades 22 and 23 is released and simultaneously, the bent portion 3f engages with the sloping portion 29a of the detent lever 29. The detent lever 29 is caused to rotate in the clockwise direction in FIG. 4 by the spring 30 so that the bent portion 22b of the first shutter blade 22 is located at a position where the bent portion 22b cannot engage with the stepped portion 29b of the detent lever 29. In this case, only the shutter blade 22 is permitted to rotate until it abuts against a fixed stop member 1a and thereafter is returned to its initial position. Thus, a low speed exposure is made.

It is understood that the present invention may be applied to other types of shutters in addition to the shutter which has been so far described as being one illustrative embodiment of the present invention.

What is claimed is:

1. An automatic exposure adjustment mechanism for cameras comprising:
  shutter blades comprising a first and second shutter blades,
  aperture diaphragm,
  a shutter speed switching member having high brightness and low brightness cam portions and being adapted to coact operatively in response to the displacement of a shutter release member,
  means adapted to engage with either of said high and low brightness cam portions when a shutter is released, thereby controlling the degree of displacement of said shutter speed switching member,
  means for coupling said first shutter blade with said second shutter blade,
  means for releasing said coupling of said first shutter blade with said second shutter blade in response to the displacement of said shutter speed switching member when the brightness of a subject to be photographed is low,
  means for controlling the degree of displacement of said shutter blades in response to the displacement of said shutter speed switching member, and
  means for controlling the aperture in response to the displacement of said shutter speed switching member,
  whereby when the brightness of a subject is high, the aperture is reduced while both of said shutter blades are actuated in unison, thereby effecting a high speed exposure, whereas when the brightness of the subject is low, the aperture is opened while only said first shutter blade is actuated, thereby effecting a low speed exposure.

References Cited

UNITED STATES PATENTS

| | | | |
|---|---|---|---|
| 3,106,144 | 10/1963 | Peterson et al. | 95—53 X |
| 3,464,333 | 9/1969 | Aoki et al. | 95—10 |

SAMUEL S. MATTHEWS, Primary Examiner

J. F. PETERS, Jr., Assistant Examiner

U.S. Cl. X.R.

95—53 R, 64 C